(12) United States Patent
Chandwani

(10) Patent No.: US 12,500,761 B2
(45) Date of Patent: Dec. 16, 2025

(54) DATA ENCRYPTION FOR MULTI-CLOUD SECURITY

(71) Applicant: Microsoft Technology Licensing, LLC, Redmond, WA (US)

(72) Inventor: Vishal Jaikishan Chandwani, Redmond, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 207 days.

(21) Appl. No.: 18/296,913

(22) Filed: Apr. 6, 2023

(65) Prior Publication Data

US 2024/0340177 A1    Oct. 10, 2024

(51) Int. Cl.
*H04L 9/30* (2006.01)
*H04L 9/06* (2006.01)
*H04L 9/08* (2006.01)

(52) U.S. Cl.
CPC .......... *H04L 9/3033* (2013.01); *H04L 9/0618* (2013.01); *H04L 9/0819* (2013.01)

(58) Field of Classification Search
USPC ........ 713/150, 163, 171, 181; 726/2, 21, 36; 380/255, 264, 276
See application file for complete search history.

(56) References Cited

U.S. PATENT DOCUMENTS

| | | | | |
|---|---|---|---|---|
| 2007/0180493 A1* | 8/2007 | Croft | ................ | H04L 63/0428 726/2 |
| 2011/0249682 A1* | 10/2011 | Kean | ................ | H04L 45/38 370/401 |
| 2013/0039634 A1* | 2/2013 | M | ................ | G08B 13/19682 386/230 |
| 2013/0222107 A1* | 8/2013 | Herscovitch | ........ | H04L 63/0428 340/5.6 |
| 2013/0303085 A1* | 11/2013 | Boucher | ............. | H04W 12/069 455/41.1 |
| 2013/0314214 A1* | 11/2013 | Leica | ................ | H04W 4/80 340/10.1 |
| 2013/0314334 A1* | 11/2013 | Leica | ................ | H04M 1/72448 345/173 |
| 2013/0344804 A1* | 12/2013 | Chen | ................ | H04B 5/48 455/41.1 |
| 2014/0173708 A1* | 6/2014 | Garlick | ............... | H04L 63/0853 726/7 |

(Continued)

OTHER PUBLICATIONS

"Bézout's Identity—Wikipedia", Retrieved From: https://web.archive.org/web/20230317163630/https://en.wikipedia.org/wiki/B%C3%A9zout%27s_identity, Mar. 17, 2023, 5 Pages.

(Continued)

*Primary Examiner* — Sharif E Ullah
(74) *Attorney, Agent, or Firm* — Barta Jones, PLLC

(57) ABSTRACT

Systems and methods for data encryption and decryption requiring successive partial decryption using multiple keys. The method is designed to generate a public key used to encrypt plaintext into an encrypted message and to generate multiple private keys, each of which are different from one another and are transmitted to separate computing devices to be used for decryption. The encrypted message is sent to one computing device for partial decryption using one private key, and the partial decryption is sent to another computing device for partial decryption using a different private key to generate the plaintext.

20 Claims, 8 Drawing Sheets

(56) References Cited

U.S. PATENT DOCUMENTS

| | | | | |
|---|---|---|---|---|
| 2014/0256251 | A1* | 9/2014 | Caceres | H04W 12/084 |
| | | | | 455/41.1 |
| 2014/0337205 | A1* | 11/2014 | Tavares | G06Q 20/385 |
| | | | | 705/39 |
| 2015/0103383 | A1* | 4/2015 | Dowling | H04N 1/00225 |
| | | | | 358/402 |
| 2015/0356281 | A1* | 12/2015 | Van Deventer | G06F 21/16 |
| | | | | 713/176 |
| 2017/0012948 | A1* | 1/2017 | Peeters | H04L 9/3247 |

OTHER PUBLICATIONS

"Bit-Length—Wikipedia", Retrieved From: https://web.archive.org/web/20230306013854/https://en.wikipedia.org/wiki/Bit-length, Mar. 6, 2023, 1 Page.

"Carmichael Function—Wikipedia", Retrieved From: https://en.wikipedia.org/wiki/Carmichael_function, Mar. 6, 2023, 5 Pages.

"Euclidean Algorithm—Wikipedia", Retrieved From: https://web.archive.org/web/20230320101653/https://en.wikipedia.org/wiki/Euclidean_algorithm, Mar. 20, 2023, 33 Pages.

"Extended Euclidean Algorithm—Wikipedia", Retrieved From: https://web.archive.org/web/20230314200405/https://en.wikipedia.org/wiki/Extended_Euclidean_algorithm, Mar. 14, 2023, 7 Pages.

"Hamming Weight—Wikipedia", Retrieved From: https://web.archive.org/web/20230316091419/https://en.wikipedia.org/wiki/Hamming_weight, Mar. 16, 2023, 8 Pages.

"How to Require Two Keyholders to Decrypt a Document?", Retrieved From: https://crypto.stackexchange.com/questions/1048/how-to-require-two-keyholders-to-decrypt-a-document, Oct. 24, 2011, 4 Pages.

"How to Require Two PRIVATE Keyholders to Decrypt a Document?", Retrieved From: https://crypto.stackexchange.com/questions/79708/how-to-require-two-private-keyholders-to-decrypt-a-document, Apr. 5, 2020, 3 Pages.

"Key Size—Wikipedia", Retrieved From: https://web.archive.org/web/20230306013840/https://en.wikipedia.org/wiki/Key_size, Mar. 6, 2023, 7 Pages.

"Least Common Multiple—Wikipedia", Retrieved From: https://web.archive.org/web/20230314195121/https://en.wikipedia.org/wiki/Least_common_multiple, Mar. 14, 2023, 8 Pages.

"Modular Multiplicative Inverse—Wikipedia", Retrieved From: https://web.archive.org/web/20230314193546/https://en.wikipedia.org/wiki/Modular_multiplicative_inverse, Mar. 14, 2023, 8 Pages.

"Primality Test—Wikipedia", Retrieved From: https://web.archive.org/web/20230309014831/https://en.wikipedia.org/wiki/Primality_test, Mar. 9, 2023, 10 Pages.

International Search Report and Written Opinion received for PCT Application No. PCT/US2024/032132, mailed on Dec. 10, 2024, 09 pages.

International Preliminary Report on Patentability (Chapter I) received for PCT Application No. PCT/US2024/032132, mailed on Oct. 16, 2025, 6 Pages.

* cited by examiner

DATA ENCRYPTION FOR MULTI-CLOUD SECURITY

BACKGROUND

Public key cryptography is a method of encrypting data that uses a public key to encrypt the data and a private key to decrypt the data. The public key is publicly available, while the private key is maintained in secret by a decryption device. However, should the private key be stolen, anyone with access with the private key can decrypt the data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Systems and methods for data encryption include includes generating, by a key generator implemented on a processor, a public key as a function of a modulus and an encryption value, determining, by the key generator, a modular multiplicative inverse of a value that involves the modulus and the encryption value, factoring, by the key generator, the modular multiplicative inverse into a first factor and a second factor, the first factor representing a first private key and the second factor representing a second private key, transmitting, by a communication interface, the first private key to a first cloud provider and transmit the second private key to a second cloud provider, encrypting, by an encryptor implemented on the processor, plaintext into an encrypted message using the generated public key, and transmitting, by the communication interface, the encrypted message to the first cloud provider for partial decryption using the first private key.

Systems and methods for data decryption include obtaining, from a first computing device, a first private key, obtaining, from a second computing device, a partially decrypted version of an encrypted message, the partially decrypted version having been decrypted by the second computing device using a second private key, and completing decryption of the partially decrypted message using the obtained first private key resulting in a fully decrypted message.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 8, the systems are illustrated as schematic drawings. The drawings may not be to scale. Any of the drawings may be combined into a single embodiment or example.

DETAILED DESCRIPTION

Figure 1:
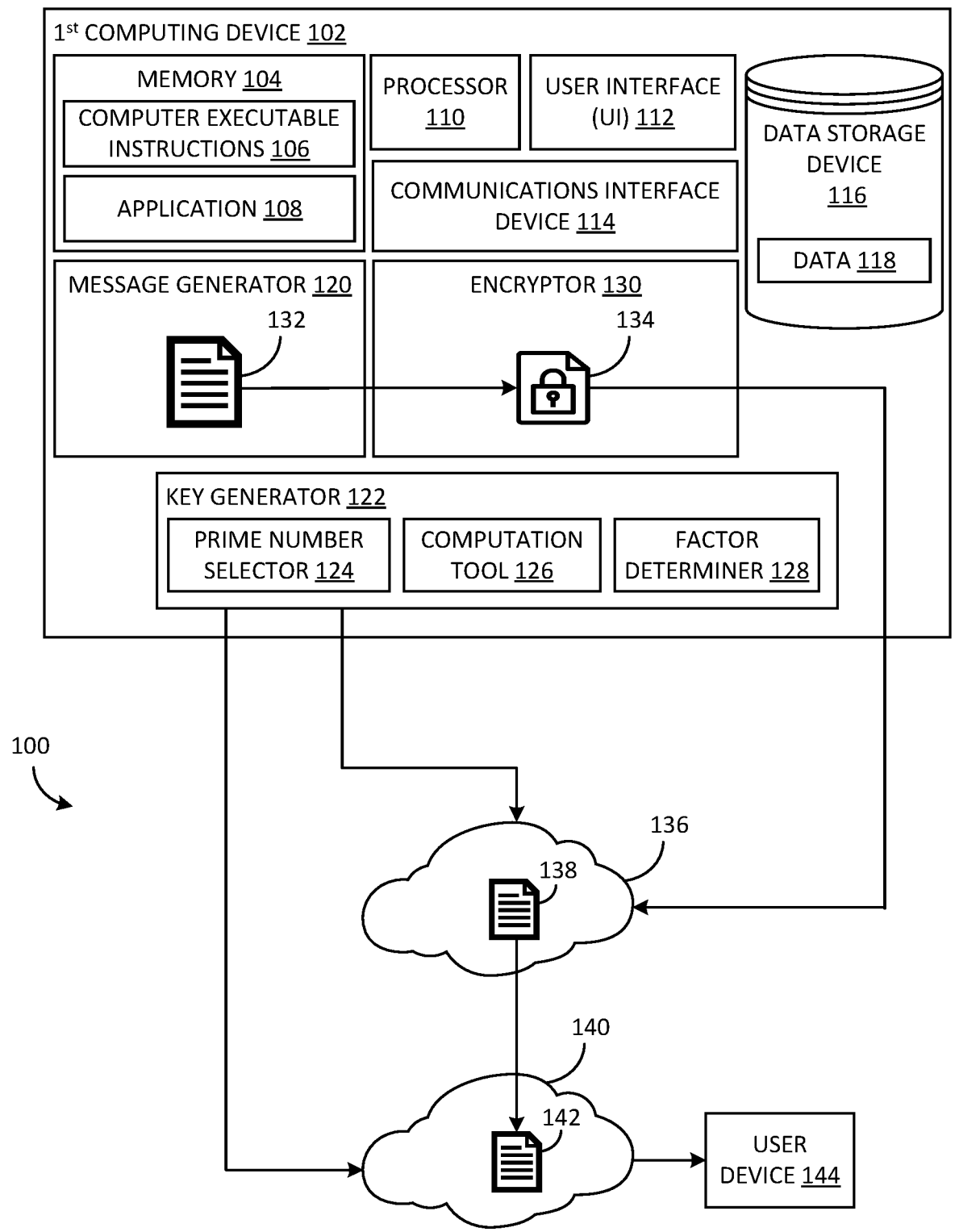
FIG. 1 is a block diagram illustrating an example system for data encryption for multi-cloud security.

The various implementations and examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

As described herein, public key cryptography is a type of cryptography where a document is encrypted using a public key and decrypted using a private key. Public key cryptography is used for a variety of implementations, including secure communication, secure online banking and shopping, and digital signatures, and is a fundamental building block of modern computer security systems, and is widely used in internet protocols such as hypertext transfer protocol secure (HTTPS) protocol, Secure Sockets Layer (SSL) protocol, and Secure Shell (SSH) protocol. Public key cryptography provides many benefits, in particular by enabling users to securely communicate without having to exchange secret keys, such as private keys, in advance. This is particularly useful for establishing secure communication between parties who have never met before or for situations where it is not practical to exchange keys in advance. Public key cryptography may implement various different algorithms, including RSA, Elliptic Curve Cryptography (ECC), and Dillie-Hellman.

However, public key cryptography may be vulnerable to attacks that involve impersonation, spoofing, or theft of private keys. For example, impersonation or spoofing could include an attacker creating a fake public key that appears to belong to a legitimate user and using the fake public key to intercept and decrypt messages that are intended for the legitimate user. In another example, theft of private keys enables anyone in possession of or having access to the private key to decrypt the message associated with the private key.

With the adoption of cloud computing, cloud service providers are more frequently being used to store data and private keys used for decryption. This takes the private keys out of the control of the parties themselves by removing the private keys from local hosts, which can lead to trust issues between a client and cloud service provider. For example, a client may have concerns that the cloud service provider has access to and may read sensitive data using the private keys stored in their cloud environment.

Current solutions generate multiple private keys and then, to decrypt a document, combine the private keys at a single provider that decrypts the encrypted document. However, these purported solutions still require the document to ultimately be decrypted by a single provider in possession of each private key that is needed, and therefore requires the same trust in the provider that performs the decryption. Hence, combining private keys does not solve the current security problem.

In contrast, aspects of the disclosure provide systems and methods of data encryption for multi-device security, such as multi-cloud, by generating multiple private keys, distributing each private key to a separate provider, encrypting a document, and enabling each provider to perform partial decryption of the encrypted document. No single provider has access to each private key, and hence no single provider can fully decrypt the document. The systems and methods provided herein further describe handshake scenarios between providers that includes passing a partially decrypted version of the document from one provider to a next provider to fully decrypt the document, finish the decryption, or otherwise complete the decryption to produce plaintext.

The systems and methods provided in the present disclosure provide a technical solution and operate in an unconventional manner at least by generating multiple private keys and distributing the generated private keys to different providers such that no single provider has access to each private key, restricting any single provider from fully decrypting a document to produce the desired plaintext. Another provider that has access to a different private key is required to complete the decryption. Thus, the systems and methods provided in the present disclosure improve the security of a file, document, message, image, video, or other data encrypted using public key cryptography by distributing specially-created and interlinked private keys to multiple providers, reducing or eliminating the likelihood that a single provider or single private key being compromised would in turn compromise the encrypted data.

The systems and methods provided herein provide a technical effect of at least improving security and reducing an error rate of machines executing the systems and methods provided herein. For example, at least the elements of generating multiple, nested, private keys and distributing each of the generated private keys to a different provider provides a technical solution to the inherently technical problem of securely encrypting and decrypting electronic data.

Creating private keys that are linked or associated, such as by factoring a modular multiplicative inverse into two factors as described herein, enhances security and provides technical efficiency. In addition, transmitting different private keys to different devices for decryption further enhances security and also provides technical efficiency. In this way, aspects of the disclosure provide a single encryption operation, thus avoiding double encryption, which reduces computational complexity.

The examples and embodiments described herein have numerous practical applications. For example, the single encryption and multiple-stage decryption processes described herein provide the following:

secure communication between parties, such as in messages (email and instant messaging), video calls, and voice calls;

secure file storage, such as when file data and/or metadata is encrypted for storage on computing devices and in the cloud;

secure financial transactions, such as online banking, payments, and settlements;

secure authentication, such as to verify the identify of users or devices; and secure digital rights management (DRM), such as when movies or music are desired to be distributed to selected consumer devices.

FIG. 1 is a block diagram illustrating a system for data encryption for multi-cloud security according to an example. The system 100 illustrated in FIG. 1 is provided for illustration only. Other examples of the system 100 can be used without departing from the scope of the present disclosure.

The system 100 includes a first computing device 102, a second computing device 136, and a third computing device 140. Each of the computing device 102, the second computing device 136, and the third computing device 140 may be communicatively coupled to and communicate via a network. The first computing device 102 represents any device executing computer-executable instructions 106 (e.g., as application programs, operating system functionality, or both) to implement the operations and functionality associated with the first computing device 102. The first computing device 102, in some examples, includes a mobile computing device or any other portable device. A mobile computing device includes, for example but without limitation, a mobile telephone, laptop, tablet, computing pad, netbook, gaming device, wearable device, Internet of Things (IoT) device, and/or portable media player. The first computing device 102 can also include less-portable devices such as servers, desktop personal computers, kiosks, IoT devices, or tabletop devices. Additionally, the first computing device 102 can represent a group of processing units or other computing devices. In some examples, the first computing device 102 is a device executed in the cloud.

In some examples, the first computing device 102 includes a memory 104 that includes the computer-executable instructions 106, a processor 110, and a user interface (UI) 112. The processor 110 includes any quantity of processing units, including but not limited to CPU(s), GPU(s), and NPU(s). The processor 110 is programmed to execute the computer-executable instructions 106. The computer-executable instructions 106 may be performed by the processor 110, performed by multiple processors 110 within the first computing device 102, or performed by a processor external to the first computing device 102. In some examples, the processor 110 is programmed to execute computer-executable instructions 106 such as those illustrated in the figures described herein, such as FIGS. 2-7. In various examples, the processor 110 is configured to execute one or more of the message generator 120, key generator 122, and encryptor 130 as described in greater detail below. In other words, the message generator 120, key generator 122, and encryptor 130, and their respective sub-components described in greater detail below, are implemented on and/or by the processor 110.

The memory 104 includes any quantity of media associated with or accessible by the first computing device 102. The memory 104 in these examples is internal to the first computing device 102, as illustrated in FIG. 1. In other examples, the memory 104 is external to the first computing device 102 or includes memory components both internal and external to the first computing device 102. The memory 104 stores data, such as the computer-executable instructions 106 and one or more applications 108. The applications 108, when executed by the processor 110, operate to perform various functions on the first computing device 102. The application 108 communicates with counterpart applications or services, such as web services accessible via a network.

The user interface 112 includes a graphics card for displaying data to a user and receiving data from the user. The user interface 112 can also include computer-executable instructions, for example a driver, for operating the graphics card. Further, the user interface 112 can include a display, for example a touch screen display or natural user interface, and/or computer-executable instructions, for example a driver, for operating the display. The user interface 112 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor.

The first computing device 102 further includes a communications interface device 114. The communications interface device 114 includes a network interface card and/or computer-executable instructions, such as a driver, for operating the network interface card. Communication between the first computing device 102 and other devices, such as but not limited to the second computing device 136 and/or the third computing device 140, can occur using any protocol or mechanism over any wired or wireless connection. In some examples, the communications interface device 114 is operable with short range communication technologies such as by using near-field communication (NFC) tags.

The first computing device 102 further includes a data storage device 116 for storing data, such as, but not limited to the data 118. The data storage device 116 in some non-limiting examples includes a redundant array of independent disks (RAID) array. The data storage device 116, in this example, is included within the first computing device 102, attached to the first computing device 102, plugged into the first computing device 102, or otherwise associated with the first computing device 102. In other examples, the data storage device 116 includes a remote data storage accessed by the first computing device 102 via a network, such as a remote data storage device, a data storage in a remote data center, or a cloud storage.

While some examples are described with reference to encrypting messages, aspects of the disclosure are operable to encrypt any data including, for example, documents, files, electronic mail, images, video, program code, machine learning training data, machine learning models, and the like.

The first computing device 102 further includes a message generator 120. In some examples, the message generator 120 is implemented by the processor 110 to generate a message, such as a plaintext message 132, that is encrypted by the encryptor 130 as described in greater detail below. The message generator 120 may generate a message in response to inputs received by a user, such as via inputs received at the first computing device 102 via the UI 112, or automatically based on the execution of the application 108. In some examples, the plaintext message 132 generated by the message generator 120 is a plaintext message. As described herein, a plaintext message refers to any type of message, document, file, and so forth prior to the message undergoing an encryption process, such as performed by the encryptor 130. Accordingly, the plaintext message may be a text file, an audio file, a video file, an image file, a spreadsheet, or any file containing a combination of text, images, audio, videos, and so forth. In an example, the plaintext message includes characters other than text.

The first computing device 102 further includes a key generator 122 that generates a public key and a plurality of private keys. More particularly, the key generator 122 generates a public key used by the encryptor 130 to encrypt the generated plaintext message 132 and a plurality of private keys that are used by a plurality of computing devices to decrypt the encrypted message. As referenced herein, the plurality of private keys includes, but is not limited to, at least two private keys. Various examples of the present disclosure provide that the key generator 122 generates more than two private keys, each of which is distributed to a separate computing device (or provider) to be used to partially decrypt the encrypted message.

The key generator 122 includes a prime number selector 124, a computation tool 126, and a factor determiner 128. The prime number selector 124 selects two prime numbers, referenced herein as a first prime number p and a second prime number q. The prime number selector 124 selects the two prime numbers at random, in an example. The first prime number p and the second prime number q are similar in magnitude but comprise different lengths. As referenced herein, the length is the number of bits that comprise the selected prime number. For example, a prime number of 17 has a length of two bits, while a prime number of 101 has a length of three bits. In some examples, the key generator 122 executes a primality test to determine whether a selected number is prime or is not prime. Various examples of a primality test include trial division, probabilistic tests, fast deterministic tests, number-theoretic methods, and so forth. The selected first prime number p and the second prime number q are maintained as secret values. As referenced herein, maintaining the selected first prime number p and the second prime number q as secret values refers to the selected first prime number p and the second prime number q not being output, transmitted, or otherwise shared with another device, user, and so forth.

The computation tool 126 generates a public key as a function of a modulus n and an encryption value e and determines a modular multiplicative inverse of a value involving the modulus and the encryption value.

The modulus is a large integer computed from the product of two distinct large prime numbers. The modulus is selected such that it is computationally infeasible to factor the modulus into its original prime numbers. The modulus is used in modular arithmetic operations. The modulus defines the finite set of possible values for the ciphertext and decrypted message. The size of the modulus determines the key length and overall security of the encryption.

The modular multiplicative inverse is an integer value computed by computing the inverse of a mathematical operation using modular arithmetic. Modular arithmetic works with numbers within a limited range, wrapping around when a limit of the range is reached. The limit of the range is defined by the modulus, which determines the range of possible numbers to be used.

For example, the computation tool 126 computes the modulus, n, that is used for the public key and each private key. The modulus n is computed by multiplying the first prime number p by the second prime number q. An example equation for the modulus n is provided below in Equation 1.

$$n = p * q \qquad (1)$$

In some examples, the modulus n is released as a part of the public key, such as a first portion of the public key. The length, i.e., the number of bits, of the modulus n is the key length. The computation tool 126 uses the modulus n to compute Carmichael's totient function, λ, of the modulus n. Carmichael's totient function of the modulus is computed by finding the least common multiple of the Carmichael's totient function of the first prime number p multiplied by the Carmichael's totient function of the second prime number q. An example equation for the Carmichael's totient function of the modulus λ(n) is provided below in Equation 2, $$\Lambda(n) = LCM(\lambda(p), \lambda(q)) \quad (2)$$

Because the first prime number p and the second prime number q are each prime numbers, $\lambda(p)=\varphi(p)=p-1$ and $\lambda(q)=q-1$. Thus, $\lambda(n)=LCM(p-1, q-1)$. Like the modulus n, the value of $\lambda(n)$ is maintained as secret.

The computation tool 126 computes the least common multiple of $(\lambda(p), \lambda(q))$ through various examples. In one example, the least common multiple of $(\lambda(p), \lambda(q))$ is computed by the execution of the Euclidean algorithm. The Euclidean algorithm is used to compute the greatest common divisor (GCD) of the first prime number p and the second prime number q. The least common multiple of the first prime number p and the second prime number q is computed by dividing the absolute value of the first prime number p and the second prime number q divided by the GCD of the first prime number p and the second prime number q. This is illustrated by Equation 3, provided below.

$$LCM(p, q) = \frac{|p*q|}{GCD(p, q)} \quad (3)$$

The computation tool 126 further selects an integer encryption value e between the values of 1 and $\lambda(n)$. For example, $1<e<\lambda(n)$ such that the $GCD(e, \lambda(n))=1$. Accordingly, the values of e and $\lambda(n)$ are coprime. In some examples, the value of e has a relatively short bit-length and a small Hamming weight value. For example, the value of e may be as small as 3, but such a short bit-length may result in weaker security of encryption. In some examples, the value of e is released as part of the public key, for example a second portion of the public key.

The computation tool 126 further computes a modular multiplicative inverse, d, of the integer e modulo $\lambda(n)$, expressed as d. In some examples, the modular multiplicative inverse, d, is a coefficient of a form of Bezout's identity and computed by multiplying $e^{-1}$ by the modulo $\lambda(n)$. This is illustrated by Equation 4, provided below.

$$d \equiv e^{-1}(\mod \lambda(n)) \quad (4)$$

Equation 4 may be derived from Equation 5 below, in which the modular multiplicative inverse, d, multiplied by the encryption value, e, is equal to one multiplied by the modulo $\lambda(n)$. Equation 5 is provided below.

$$D*e \equiv 1(\mod \lambda(n)) \quad (5)$$

As noted herein, the value of the modular multiplicative inverse, d, is a non-prime number. In examples where the value of the modular multiplicative inverse, d, is computed to be a prime number, the computation tool 126 computes a new, second encryption value, e, that is used to compute a new modular multiplicative inverse, d, before proceeding further. When a non-prime modular multiplicative inverse is selected, the process continues.

The factor determiner 128 determines a plurality of factors, k, of the modular multiplicative inverse, d, computed by the computation tool 126. Each of the plurality of factors is used by different computing devices to partially decrypt an encrypted message that has been encrypted by the generated public key. In some examples, the factor determiner 128 determines two factors k of the modular multiplicative inverse, d, such that one computing device, such as the second computing device 136, partially decrypts an encrypted message using one of the factors k1 as a private key and the third computing device 140 partially decrypts the partially decrypted message using the other factor k2 as another private key, thus resulting in a fully decrypted message. In other examples, the factor determiner 128 determines more than two factors k of the modular multiplicative inverse, d, such that more than two computing devices are required to each partially decrypt the encrypted message, ultimately resulting in a fully decrypted message. In other words, three factors k of the modular multiplicative inverse, d, may be generated and three computing devices are used to each partially decrypt the encrypted message, four factors k of the modular multiplicative inverse, d, may be generated and four computing devices are used to each partially decrypt the encrypted message, and so forth.

In some examples, the factors k of the modular multiplicative inverse, d, are generated such that $d=k1*k2*\ldots kn$ and stored as respective private keys (also known as private key exponents). In examples where two private keys k1 and k2 are generated, the private keys are generated by $d=k1*k2$. In examples where three private keys k1, k2, and k3 are generated, the private keys are generated by $d=k1*k2*k3$. In some examples, the number or quantity of private keys that are generated is determined by a user of the first computing device 102 (e.g., the user that generates the plaintext message 132), enterprise requirements, application requirements, original equipment manufacturers (OEMs), or other entities. In other examples, the number of private keys that are generated is a default value, such as two factors, three factors, and so forth.

Each private key k1, k2, . . . kn is transmitted by the communications interface device 114 to a separate external device, such as a computing device. For example, where the factor determiner 128 generates two private keys, k1 and k2, the communications interface device 114 transmits the first private key k1 to the second computing device 136 and the second private key k2 to the third computing device 140.

The encryptor 130 encrypts the plaintext message 132 using the generated public key. The encryptor 130 generates a ciphertext 134 as the encrypted version of the plaintext message 132. In some examples, the plaintext message 132 is encrypted into a ciphertext 134, C, by converting the plaintext message 132 into an integer padded plaintext, m, by multiplying the integer padded plaintext, m, raised to the power of the integer e then taken modulo n. This is illustrated by Equation 6, provided below.

$$C = m^e (\mod n) \quad (6)$$

The communications interface device 114 transmits the ciphertext 134 to an external computing device. For example, the communications interface device 114 transmits the ciphertext 134 to one of the second computing device 136 or the third computing device 140. As shown in FIG. 1, the communications interface device 114 transmits the ciphertext to the second computing device 136. As noted above, the second computing device 136 has received the first private key k1 from the first computing device 102. The second computing device 136 partially decrypts the ciphertext 134 by applying the first private key k1 to the ciphertext 134. This includes raising the ciphertext 134 to the power of the first private key k1 then taken modulo n, resulting in a partially decrypted ciphertext 138. This is illustrated by Equation 7, provided below, where C1 represents the partially decrypted ciphertext 138.

$$C1 = C^{k1} (\mod n) \quad (7)$$

It should be understood that as referenced herein, the term partial decryption or partially decrypted refers to a part, less than an entirety, of the decryption process being performed. The process is performed on the entire ciphertext 138. It should be understood that partial decryption does not refer to a portion of the data in the encrypted ciphertext 134 being fully decrypted and another portion of the data in the encrypted ciphertext 134 remaining fully encrypted.

The second computing device 136 transmits the partially decrypted ciphertext 138 to the third computing device 140. As noted above, the third computing device 140 has received the second private key k2 from the first computing device 102. The third computing device 140 partially decrypts the partially decrypted ciphertext 138 by applying the second private key k2 to the partially decrypted ciphertext 138. This includes raising the ciphertext 138 to the power of the second private key k2 then taken modulo n, resulting in a fully decrypted plaintext 142. This is illustrated by Equation 8, provided below, where m represents the decrypted plaintext 142.

$$m = C1^{k2} (\mod n) \quad (8)$$

The decrypted plaintext 142 is the generated plaintext message 132. Accordingly, following the ciphertext 134 being partially decrypted by the second computing device 136, resulting in the partially decrypted ciphertext 138, and the partially decrypted ciphertext 138 being partially decrypted by the third computing device 140, the decrypted plaintext 142 is produced. The decrypted plaintext 142 is a fully decrypted version of the initially generated plaintext message 132. Accordingly, no single computing device in this example is able to fully decrypt the ciphertext 134 without receiving the partially decrypted text from another computing device. This arrangement enables multi-device, such as multi-cloud, encryption without the need to encrypt data more than one time.

In other examples, a single computing device is able to fully decrypt the ciphertext 134 if that single computing device has both the first and second private keys, and performs two successive partial decryption operations, as described herein (e.g., performs the operations described above being performed by the second computing device 136 and the third computing device 140). As an example of such an embodiment, the first private key is maintained by the single computing device, and the second private key is input by a user (e.g., as a password). In such an example, the encrypted data is only able to be decrypted on the single computing device because only the single computing device has the first private key. This is beneficial for corporate environments where work-related sensitive data is only able to be viewed on a corporate device, rather than the user's personal laptop, personal mobile device, etc.

It should be understood that although illustrated in FIG. 1 as including two private keys k1 and k2 and the ciphertext 134 being transmitted to the second computing device 136, being partially decrypted into the partially decrypted ciphertext 138 which is transmitted to the third computing device 140 and partially decrypted resulting in the fully decrypted plaintext 142, various examples are possible. In one example, the ciphertext 134 is transmitted to the third computing device 140 and partially decrypted using the second private key k2, resulting in a partially decrypted ciphertext. This is illustrated by Equation 9, provided below.

$$C2 = C^{k2} (\mod n) \quad (9)$$

The partially decrypted ciphertext is then transmitted to the second computing device 136, which decrypts the partially decrypted ciphertext using the first private key k1, resulting in a fully decrypted ciphertext. This is illustrated by Equation 10, provided below.

$$m = C2^{k1} (\mod n) \quad (10)$$

In another example, the factor determiner 128 generates more than two private keys and the communications interface device 114 transmits each private key to a separate computing device. A first external computing device performs partial decryption using a first private key, sends the partially decrypted ciphertext to a next computing device for partial decryption using a next private key, and so forth until the ciphertext 134 is partially decrypted by a last private key resulting in a fully decrypted plaintext 142.

The system 100 further includes a user device 144. In some examples, following the ciphertext 134 being fully decrypted resulting in a fully decrypted plaintext 142, the third computing device 140 outputs the fully decrypted plaintext 142 to a user device 144. In some examples, the user device 144 is a mobile electronic device, a laptop, a desktop, a tablet, a wearable device, a head-mounted unit (HMU), or any other suitable electronic device for presenting the fully decrypted plaintext 142. Because the presented plaintext 142 is fully decrypted, the user device 144 may be used to access, view, modify, and so forth the plaintext 142. In some examples, the user device 144 is the third computing device 140.

Figure 2:
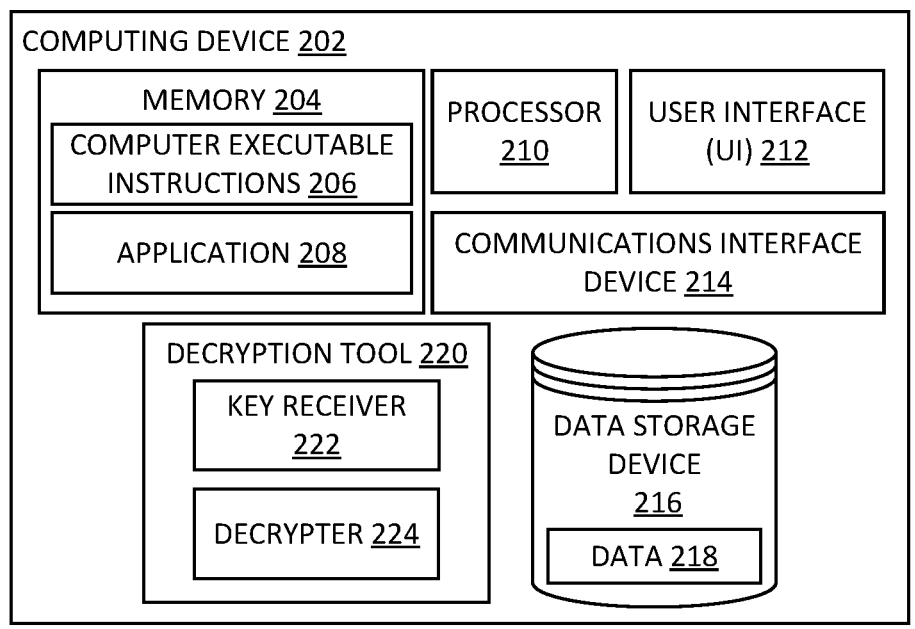
FIG. 2 is a block diagram illustrating an example device for data decryption.

FIG. 2 is a block diagram illustrating a device for data decryption according to an example. The computing device 202 illustrated in FIG. 2 is provided for illustration only. Other examples of the computing device 202 can be used without departing from the scope of the present disclosure. In some examples, the computing device 202 is an example of one or both of the second computing device 136 and the third computing device 140 illustrated in FIG. 1.

The computing device 202 represents any device executing computer-executable instructions 206 (e.g., as application programs, operating system functionality, or both) to implement the operations and functionality associated with the computing device 202. The computing device 202, in some examples, includes a mobile computing device or any other portable device. A mobile computing device includes, for example but without limitation, a mobile telephone, laptop, tablet, computing pad, netbook, gaming device, wearable device, Internet of Things (IoT) device, and/or portable media player. The computing device 202 can also include less-portable devices such as servers, desktop personal computers, kiosks, IoT devices, or tabletop devices. In some examples, the computing device 202 can represent a group of processing units or other computing devices. In some examples, the computing device 202 is a device executed in the cloud and represents a cloud-based device or environment.

In some examples, the computing device 202 includes a memory 204 that includes the computer-executable instructions 206, a processor 210, and a UI 212. The processor 210 includes any quantity of processing units, including but not limited to CPU(s), GPU(s), and NPU(s). The processor 210 is programmed to execute the computer-executable instructions 206. The computer-executable instructions 206 may be performed by the processor 210, performed by multiple processors 210 within the computing device 202, or performed by a processor external to the computing device 202. In some examples, the processor 210 is programmed to execute computer-executable instructions 206 such as those illustrated in the figures described herein, such as FIGS. 1 and 3-6. In various examples, the processor 210 is configured to execute the decryption tool 220 described in greater detail below. In other words, the decryption tool 220 is implemented on and/or by the processor 210.

The memory 204 includes any quantity of media associated with or accessible by the computing device 202. The memory 204 in these examples is internal to the computing device 202, as illustrated in FIG. 2. In other examples, the memory 204 is external to the computing device 202 or includes memory components both internal and external to the computing device 202. The memory 204 stores data, such as the computer-executable instructions 206 and one or more applications 208. The applications 208, when executed by the processor 210, operate to perform various functions on the computing device 202. The application 208 communicates with counterpart applications or services, such as web services accessible via a network.

The UI 212 includes a graphics card for displaying data to a user and receiving data from the user. The UI 212 can also include computer-executable instructions, for example a driver, for operating the graphics card. Further, the UI 212 can include a display, for example a touch screen display or natural user interface, and/or computer-executable instructions, for example a driver, for operating the display. The UI 212 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor.

The computing device 202 further includes a communications interface device 214. The communications interface device 214 includes a network interface card and/or computer-executable instructions, such as a driver, for operating the network interface card. Communication between the computing device 202 and other devices, such as but not limited to the first computing device 102 and/or another example of the computing device 202, can occur using any protocol or mechanism over any wired or wireless connection. In some examples, the communications interface device 214 is operable with short range communication technologies such as by using near-field communication (NFC) tags. In some examples, the communications interface device 214 receives a private key from the first computing device 102. In some examples, the communications interface device 214 receives a fully encrypted ciphertext, such as the ciphertext 134, from the first computing device 102 and sends a partially decrypted ciphertext 138 to another example of the computing device 202. In some examples, the communications interface device 214 receives a partially decrypted ciphertext 138 from another example of the computing device 202, and the computing device 202 decrypts the received, partially decrypted ciphertext 138.

The computing device 202 further includes a data storage device 216 for storing data, such as, but not limited to the data 218. The data storage device 216 in some non-limiting examples includes a redundant array of independent disks (RAID) array. The data storage device 216, in this example, is included within the computing device 202, attached to the computing device 202, plugged into the computing device 202, or otherwise associated with the computing device 202. In other examples, the data storage device 216 includes a remote data storage accessed by the computing device 202 via a network, such as a remote data storage device, a data storage in a remote data center, or a cloud storage.

The computing device 202 further includes a decryption tool 220. The decryption tool 220 includes a key receiver 222 and a decrypter 224. The key receiver 222 receives a private key, such as the first private key k1 or the second private key k2, from the first computing device 102 illustrated in FIG. 1. The decrypter 224 applies the received private key to a received ciphertext, including but not limited to the ciphertext 134 or the partially decrypted ciphertext 138, to partially decrypt the received ciphertext. In various examples, the decrypter 224 partially decrypting the ciphertext results in either an example of a fully decrypted plaintext message, such as the decrypted plaintext 142, or an example of the partially decrypted ciphertext 138.

In an example where the computing device 202 receives the ciphertext 134, the decrypter 224 applies the received private key k1, received by the key receiver 222, to partially decrypt the ciphertext 134 using Equation 7 described above. The result of the partial decryption is the partially encrypted ciphertext 138. The communications interface device 214 then transmits the partially encrypted ciphertext 138 to another example of the computing device 202, such as the third computing device 140 as illustrated in FIG. 1.

In an example where the computing device 202 receives the partially encrypted ciphertext 138, the decrypter 224 applies the received private key k2, received by the key receiver 222, to partially decrypt the partially encrypted ciphertext 138 using Equation 8 described above. In examples where two private keys k1 and k2 are generated by the key generator 122, the result of a second example of the computing device 202 partially decrypting the partially encrypted ciphertext 138 is the decrypted plaintext 142. In some examples, following the partially encrypted ciphertext 138 being fully decrypted into the decrypted plaintext 142, the communications interface device 214 outputs the decrypted plaintext 142 to the user, to an application, or to a user device, such as the user device 144.

Figure 3:
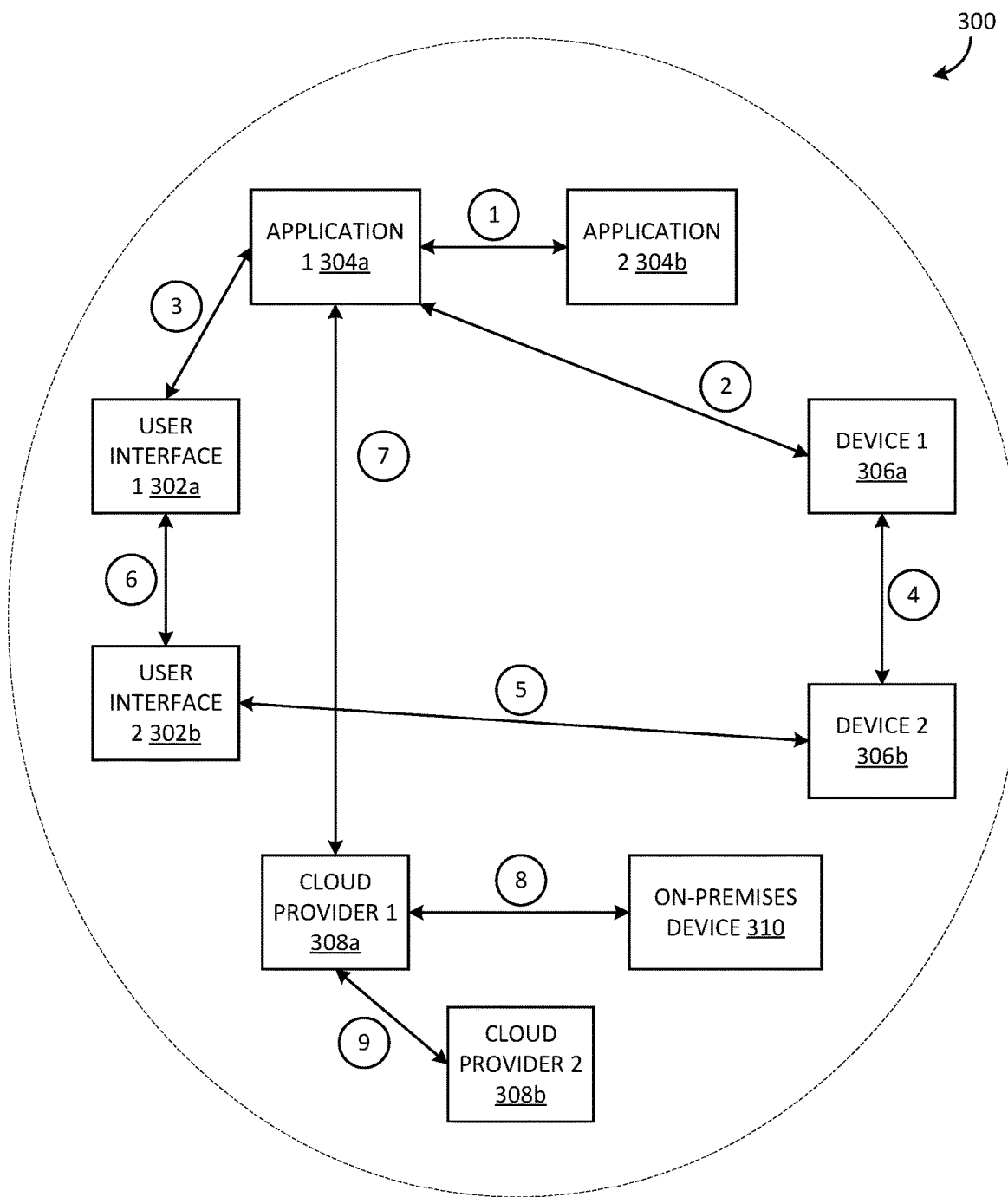
FIG. 3 is a block diagram illustrating an example system for data decryption.

FIG. 3 is block diagram illustrating a system for data decryption according to an example. The system 300 illustrated in FIG. 3 is provided for illustration only. Other examples of the system 300 can be used without departing from the scope of the present disclosure.

The system 300 illustrates various handshake scenarios between user interfaces 302a-302b, applications 304a-304b, devices 306a-306b, cloud providers 308a-308b, and an on-premises device 310. As referenced herein, a handshake scenarios describes communication between one device, cloud provider, application, etc. that performs a first partial decryption and a second device, cloud provider, application, etc. that performs subsequent partial decryption. Each handshake scenario enables the partially decrypted ciphertext 138 to be transferred for additional (or final) partial decryption by the subsequent device, cloud provider, application, etc.

A first handshake scenario (1) illustrated in FIG. 3 is between a first application 304a and a second application 304b. In this example, the first application 304a is an example of the second computing device 136 and the second application 304b is an example of the third computing device 140 as illustrated in FIG. 1. In the first handshake scenario (1), the first application 304a performs a first partial decryption of a ciphertext 134 using a first private key k1 resulting in the partially decrypted ciphertext 138. The partially decrypted data of the partially decrypted ciphertext 138 is transferred to the second application 304b, which performs a second partial decryption of the partially decrypted ciphertext 138 using a second private key k2.

A second handshake scenario (2) is between an application 304a and an electronic device 306a. In this example, the application 304a is an example of the second computing device 136 and the electronic device 306a is an example of the third computing device 140 as illustrated in FIG. 1. In the second handshake scenario (2), the application 304a performs a first partial decryption of a ciphertext 134 using a first private key k1 resulting in the partially decrypted ciphertext 138. The partially decrypted data of the partially decrypted ciphertext 138 is transferred to the electronic device 306a, which performs a second partial decryption of the partially decrypted ciphertext 138 using a second private key k2.

A third handshake scenario (3) is between an application 304a and a user interface 302a. In this example, the application 304a is an example of the second computing device 136 and the user interface 302a is an example of the third computing device 140 as illustrated in FIG. 1. In the third handshake scenario (3), the application 304a performs a first partial decryption of a ciphertext 134 using a first private key k1 resulting in the partially decrypted ciphertext 138. The partially decrypted data of the partially decrypted ciphertext 138 is transferred to the user interface 302a, which performs a second partial decryption of the partially decrypted ciphertext 138 using a second private key k2. In examples where the partial decryption is performed by a user interface 302a or 302b, the second private key k2 may be a password, code or other secret entered by a user into the user interface 302a to initiate the partial decryption.

A fourth handshake scenario (4) is between a first electronic device 306a and a second electronic device 306b. In this example, the first electronic device 306a is an example of the second computing device 136 and the second electronic device 306b is an example of the third computing device 140 as illustrated in FIG. 1. In the fourth handshake scenario (4), the first electronic device 306a performs a first partial decryption of a ciphertext 134 using a first private key k1 resulting in the partially decrypted ciphertext 138. The partially decrypted data of the partially decrypted ciphertext 138 is transferred to the second electronic device 306b, which performs a second partial decryption of the partially decrypted ciphertext 138 using a second private key k2.

A fifth handshake scenario (5) is between an electronic device 306b and a user interface 302b. In this example, the electronic device 306a is an example of the second computing device 136 and the user interface 302b is an example of the third computing device 140 as illustrated in FIG. 1. In the fifth handshake scenario (5), the electronic device 306b performs a first partial decryption of a ciphertext 134 using a first private key k1 resulting in the partially decrypted ciphertext 138. The partially decrypted data of the partially decrypted ciphertext 138 is transferred to the user interface 302b, which performs a second partial decryption of the partially decrypted ciphertext 138 using a second private key k2. As described herein, in examples where the partial decryption is performed by a user interface 302a or 302b, as provided in the third handshake scenario (3), the second private key k2 may be entered by a user into the user interface 302a to initiate the partial decryption.

A sixth handshake scenario (6) is between a first user interface 302a and a second user interface 302b. In this example, the first user interface 302a is an example of the second computing device 136 and the second user interface 302b is an example of the third computing device 140 as illustrated in FIG. 1. In the sixth handshake scenario (6), the first user interface 302a performs a first partial decryption of a ciphertext 134 using a first private key k1 resulting in the partially decrypted ciphertext 138. The partially decrypted data of the partially decrypted ciphertext 138 is transferred to the second user interface 302b, which performs a second partial decryption of the partially decrypted ciphertext 138 using a second private key k2. As described herein, in examples where the partial decryption is performed by a user interface 302a or 302b, as provided in the third handshake scenario (3), the second private key k2 may be entered by a user into the user interface 302a to initiate the partial decryption.

A seventh handshake scenario (7) is between an application 304a and a cloud provider 308a. In this example, the application 304a is an example of the second computing device 136 and the cloud provider 308a is an example of the third computing device 140 as illustrated in FIG. 1. In the seventh handshake scenario (7), the application 304a performs a first partial decryption of a ciphertext 134 using a first private key k1 resulting in the partially decrypted ciphertext 138. The partially decrypted data of the partially decrypted ciphertext 138 is transferred to the cloud provider 308a, which performs a second partial decryption of the partially decrypted ciphertext 138 using a second private key k2.

An eighth handshake scenario (8) is between a cloud provider 308a and an on-premises device 310. In this example, the cloud provider 308a is an example of the second computing device 136 and the on-premises device 310 is an example of the third computing device 140 as illustrated in FIG. 1. In eighth fourth handshake scenario (8), the cloud provider 308a performs a first partial decryption of a ciphertext 134 using a first private key k1 resulting in the partially decrypted ciphertext 138. The partially decrypted data of the partially decrypted ciphertext 138 is transferred to the on-premises device 310, which performs a second partial decryption of the partially decrypted ciphertext 138 using a second private key k2. In this example, the on-premises device 310 refers to a computing resource, such as hardware or software, that is located within an organization's physical location, as opposed to being hosted in a cloud or provided as a service by a third party.

A ninth handshake scenario (9) is between a first cloud provider 308a and a second cloud provider 308b. In this example, the first cloud provider 308a is an example of the second computing device 136 and the second cloud provider 308b is an example of the third computing device 140 as illustrated in FIG. 1. In the ninth handshake scenario (9), the first cloud provider 308a performs a first partial decryption of a ciphertext 134 using a first private key k1 resulting in the partially decrypted ciphertext 138. The partially decrypted data of the partially decrypted ciphertext 138 is transferred to the second cloud provider 308b, which performs a second partial decryption of the partially decrypted ciphertext 138 using a second private key k2.

It should be understood that in some examples, combinations of different handshake scenarios are used in order to fully decrypt a ciphertext, such as in examples where more than two private keys are generated and sent to more than two different computing devices to be used for decryption. In one example, three private keys are generated. One private key is sent to the first device 306a, a second private key is sent to the second device 306b, and a third private key is sent to the user interface 302b. The first device 306a performs a first partial decryption of a ciphertext and then the fourth handshake scenario (4) between the first device 306a and the second device 306b occurs. The second device 306b performs a second partial decryption of the partially decrypted ciphertext and then the fifth handshake scenario (5) between the second device 306b and the user interface 302b occurs. The user interface 302b performs a third partial decryption of the partially decrypted ciphertext, resulting in a fully decrypted plaintext message.

Similarly, each handshake scenario (1)-(9) described herein is further operable in a reverse order than as described. For example, the second handshake scenario (2) is described as the application 304a performing a first partial decryption of a ciphertext 134 using a first private key k1 resulting in the partially decrypted ciphertext 138 and the electronic device 306a performing a second partial decryption of the partially decrypted ciphertext 138 using a second private key k2. However, in another example of the second handshake scenario (2), the electronic device 306a performs a first partial decryption of a ciphertext 134 to generate a partially decrypted ciphertext 138 and the application 304a performs a second partial decryption of the partially decrypted ciphertext 138 resulting in a fully decrypted plaintext 142.

Figure 4:
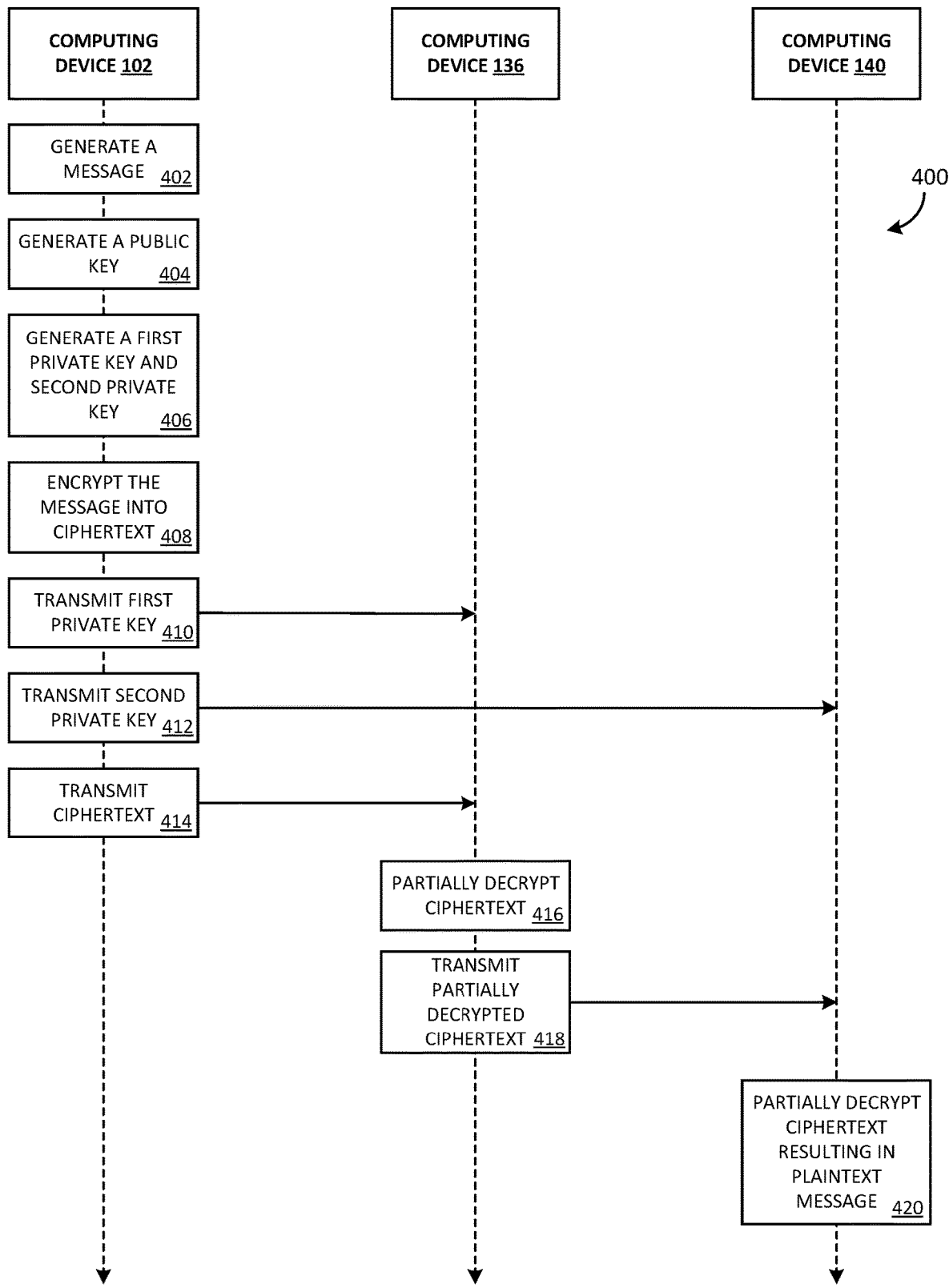
FIG. 4 is a flowchart illustrating an example computer-implemented method of data encryption and decryption.

FIG. 4 is an example flowchart illustrating a computer-implemented method of data encryption and decryption according to an example. The computer-implemented method 400 of FIG. 4 is provided for illustration only and should not be construed as limiting. Other examples of the computer-implemented method 400 can be used without departing from the scope of the present disclosure. In some examples, the computer-implemented method 400 is implemented by one or more components of the system 100, including the first computing device 102, the second computing device 136, and the third computing device 140.

The computer-implemented method 400 begins by the message generator 120 of the first computing device 102 generating a plaintext message, such as the plaintext message 132, in operation 402. As described herein, various examples of the plaintext message 132 include any type of message, document, file, and so forth prior to the message undergoing an encryption process. In various examples, the plaintext message 132 may be a text file, an audio file, a video file, an image file, a spreadsheet, or any file containing a combination of text, images, audio, videos, and so forth.

In operation 404, the key generator 122 of the first computing device 102 generates a public key. As described herein, the first computing device 102 generates the public key as a function of a modulus n and an encryption value e and determines a modular multiplicative inverse of a value involving the modulus and the encryption value. The modulus n is computed and released as the first portion of the public key. The first computing device 102 further computes or selects a value of the encryption value e that is released as the second portion of the public key.

In operation 406, the key generator 122 of the first computing device 102 generates at least a first private key and a second private key. The first computing device 102 determines a modular multiplicative inverse of a value that involves the modulus and the encryption value and then factors the modular multiplicative inverse into at least a first factor and a second factor. The first factor is used as the first private key k1 and the second factor is used as the second private key k2. It should be understood that the number of private keys k generated in operation 406 corresponds to the number of computing devices that are to be used to decrypt the encrypted version of the plaintext message 132, in an example. For example, where two computing devices are to be used to decrypt the encrypted version of the plaintext message 132, the modular multiplicative inverse is factored into two factors that are used as the two private keys k1 and k2. In another example, where three computing devices (or other processing entities) are to be used to decrypt the encrypted version of the plaintext message 132, the modular multiplicative inverse is factored into three factors that are used as the two private keys k1, k2, and k3.

In operation 408, the encryptor 130 of the first computing device 102 encrypts the plaintext message 132 using the generated public key, resulting in a ciphertext 134. The first computing device 102 encrypts the plaintext message 132 into a ciphertext 134, by converting the plaintext message 132 into an integer padded plaintext, m, by multiplying the integer padded plaintext, m, raised to the integer e then taken modulo n.

In operation 410, the communications interface device 114 of the first computing device 102 transmits the first private key k1 to the second computing device 136 and in operation 412, the communications interface device 114 of the first computing device 102 transmits the second private key k2 to the third computing device 140. Although described herein as occurring in sequence, various examples are possible. Operation 410 may be performed prior to operation 412, operation 412 may be performed prior to operation 410, or operations 410 and 412 may be otherwise be performed in parallel, simultaneously, synchronously, or asynchronously.

In operation 414, the communications interface device 114 of the first computing device 102 transmits the ciphertext 134 to the second computing device 136. In operation 416, the second computing device 136 partially decrypts the received ciphertext 134 by applying the received first private key k1. As described herein, the second computing device 136 partially decrypts the received ciphertext 134 by applying the first private key k1 to the ciphertext 134, resulting in a partially decrypted ciphertext 138.

In operation 418, the communications interface device 214 of the second computing device 136 transmits the partially decrypted ciphertext 138 to the third computing device 140. In some examples, transmitting the partially decrypted ciphertext 138 reflects one of the handshake scenarios illustrated in FIG. 3 and described herein. The particular handshake scenario depends on the particular implementation of each of the second computing device 136 and the third computing device 140. For example, where each of the second computing device 136 and the third computing device 140 is a cloud provider, such as the first cloud provider 308a and the second cloud provider 308b, respectively, the ninth handshake scenario (9) occurs between the second computing device 136 and the third computing device 140 as described above. In another example, where the second computing device 136 is an application 304a and the third computing device 140 is a cloud provider 308a, the seventh handshake scenario (7) occurs between the second computing device 136 and the third computing device 140 as described above. Accordingly, any of the handshake scenarios described herein may occur in operation 418, and the particular handshake scenario that occurs is based on the respective implementations of the second computing device 136 and the third computing device 140.

In operation 420, the third computing device 140 partially decrypts the partially decrypted ciphertext 138 by applying the second private key k2 to the partially decrypted ciphertext 138, resulting in a fully decrypted plaintext 142. The fully decrypted plaintext 142 is then ready to be output for access, such as output to a user device 144 or output via the third computing device 140. The computer-implemented method 400 then terminates.

Figure 5:
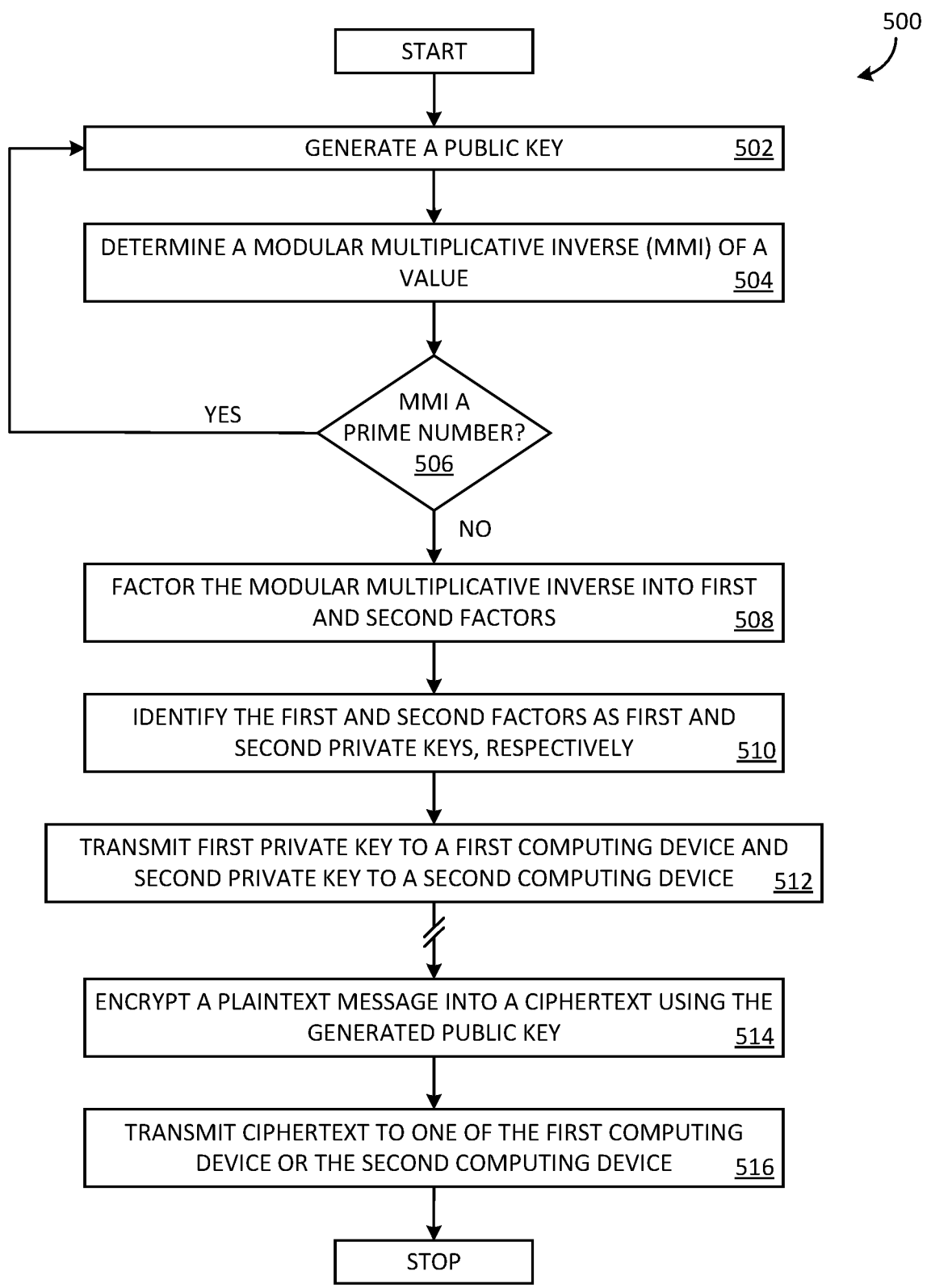
FIG. 5 is a flowchart illustrating an example computer-implemented method of data encryption.

FIG. 5 is an example flowchart illustrating a computer-implemented method of data encryption according to an example. The computer-implemented method 500 of FIG. 5 is provided for illustration only and should not be construed as limiting. Other examples of the computer-implemented method 500 can be used without departing from the scope of the present disclosure. In some examples, the computer-implemented method 500 is implemented by one or more components of the system 100, including the first computing device 102.

The computer-implemented method 500 begins with the key generator 122 generating a public key in operation 502. As described herein, the key generator 122 generates the public key as a function of a modulus n and an encryption value. The key generator 122 selects a first prime number p and second prime number q, generates the modulus n based on the selected first prime number and the selected second prime number, and releases the generated modulus n as the first portion of the public key. The key generator 122 further computes a Carmichael's totient function as a function of the generated modulus and selects an encryption integer e between one and the computed value of the Carmichael's totient function. The selected integer is released as a second portion of the public key. The public key is then generated by combining the first portion and the second portion. For example, the public key is represented as the pair of values (e, n), or as a single value concatenating e and n.

While some examples use Carmichael's totient function, aspects of the disclosure are operable with other totient functions, such as Euler's totient function.

In operation 504, the key generator 122 determines a modular multiplicative inverse of a value that involves the modulus and the encryption value. For example, the modular multiplicative inverse is determined by applying Equation 4 as described herein. In operation 506, the key generator 122 determines whether the determined modular multiplicative inverse is a prime number. In examples where the modular multiplicative inverse is determined to be a prime number, the computer-implemented method 500 returns to operation 502 and generates a new public key based on a selected different encryption value e. A modular multiplicative inverse that is a prime number restricts the factoring process that is used to generate the private keys, so the key generator 122 generates a public key in operation 502 that has a modular multiplicative inverse with a non-prime value. In examples where the modular multiplicative inverse is determined not to be a prime number, the computer-implemented method proceeds to operation 508.

In operation 508, the key generator 122 factors the modular multiplicative inverse into a plurality of factors, including at least a first factor and second factor. The number of factors is dependent on the number of computing devices that are to be used to decrypt a ciphertext using the private keys. In one example, the factor determiner 128 determines two factors k of the modular multiplicative inverse, d, such that one computing device, such as the second computing device 136 partially decrypts an encrypted message using one of the factors k1 as a private key and the third computing device 140 partially decrypts the encrypted message using the other factor k2 as another private key. In other examples, three factors k of the modular multiplicative inverse, d, may be generated and three computing devices are used to partially decrypt the encrypted message, four factors k of the modular multiplicative inverse, d, may be generated and four computing devices are used to partially decrypt the encrypted message, and so forth. In operation 510, the factors are identified as the private keys k. For example, the first factor is identified as the first private key k1, the second factor is identified as the second private key k2, and so forth. In some examples, the factors are different, resulting in the first private key k1 being different from the second private key k2.

In operation 512, the communications interface device 114 transmits the first private key k1 to one computing device, such as the second computing device 136, and transmits the second private key k2 to a different computing device, such as the third computing device 140. Accordingly, each computing device receives only one private key such that no single device receives all private keys needed to fully decrypt a ciphertext without at least one other computing device required to performed partial decryption of the ciphertext.

In operation 514, the encryptor 130 encrypts a plaintext message 132 into a ciphertext 134 using the generated public key. For example, the encryptor 130 converts the plaintext message 132 into an integer padded plaintext, m, by multiplying the integer padded plaintext, m, raised to the integer e modulo n, resulting in the ciphertext 134. It should be understood that although operations 512 and 514 are illustrated in FIG. 5 as occurring in sequence, various examples are possible. In various examples, operation 512 is performed prior to operation 514 or operation 514 is performed prior to operation 512.

In operation 516, the communications interface device 114 transmits the ciphertext 134 to one of the second computing device 136 or the third computing device 140 that has received one of the private keys k. The computer-implemented method 500 then terminates.

Figure 6:
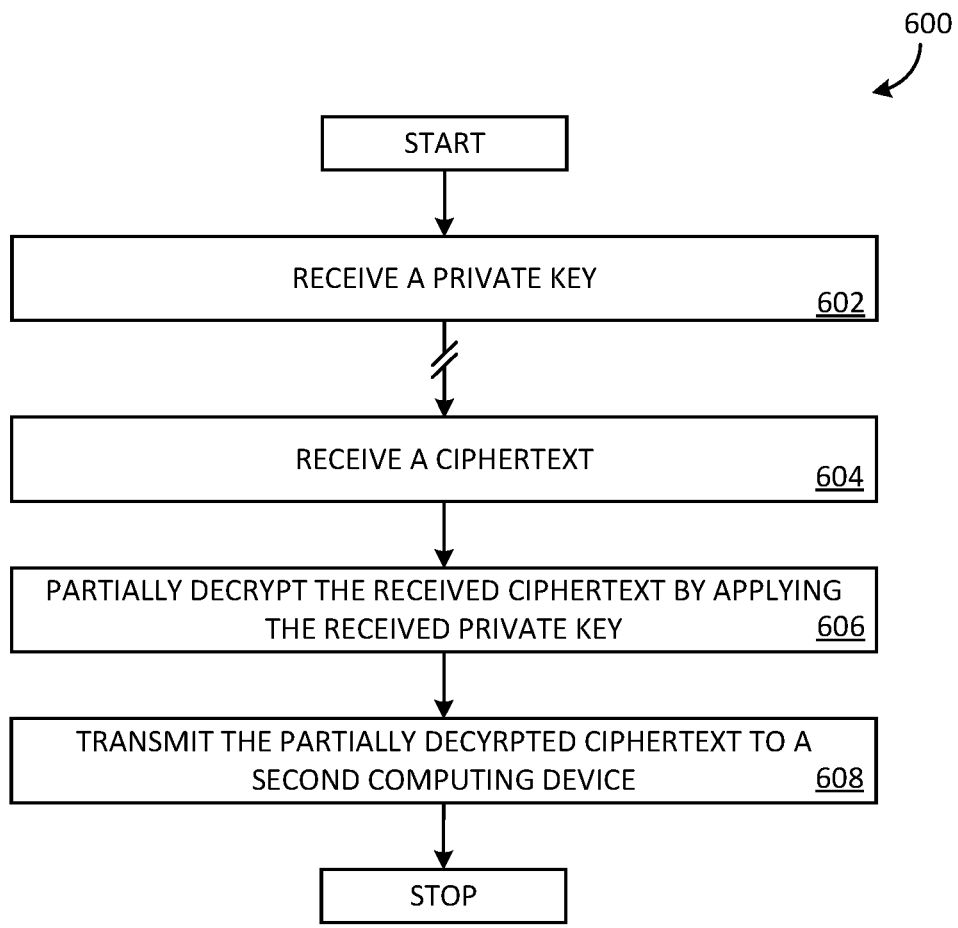
FIG. 6 is a flowchart illustrating an example computer-implemented method of data decryption.

FIG. 6 is an example flowchart illustrating a computer-implemented method of data decryption according to an example. The computer-implemented method 600 of FIG. 6 is provided for illustration only and should not be construed as limiting. Other examples of the computer-implemented method 600 can be used without departing from the scope of the present disclosure. In some examples, the computer-implemented method 600 is implemented by the computing device 202, which may be implemented as either the second computing device 136 or the third computing device 140 as described herein. As described herein, the computer-implemented method 600 illustrates an example of data decryption that does not result in a fully decrypted plaintext 142, such as partial decryption performed where at least one additional iteration of partial decryption is needed later to result in the fully decrypted plaintext 142. For example, the computer-implemented method 600 is performed by a computing device 202 prior to the computer-implemented method 700, described in greater detail herein resulting in a fully decrypted plaintext 142, being performed by a different iteration or implementation of the computing device 202.

The computer-implemented method 600 begins by the communications interface device 214 of the computing device 202 receiving a private key k from the first computing device 102 in operation 602. As described herein, the computing device 202 receives a single private key k that may be used to partially decrypt a ciphertext 134, but not fully decrypt the ciphertext 134.

In operation 604, the communications interface device 214 of the computing device 202 receives a ciphertext 134 from the first computing device 102 or another example of the computing device 202. In some examples, the received ciphertext 134 is a fully encrypted ciphertext 134 that has not been decrypted at all by another example of the computing device 202. In other examples, the received ciphertext may be an example of a partially decrypted ciphertext, such as the partially decrypted ciphertext 138.

In operation 606, the decryption tool 220 of the computing device 202 partially decrypts the received ciphertext by applying the private key k received in operation 606. In some examples, such as where the ciphertext 134 is received in operation 604, the computing device 202 partially decrypts the received ciphertext 134 by applying the received private key k to the ciphertext 134 modulo n, resulting in a partially decrypted ciphertext 138. In other examples, such as where the partially decrypted ciphertext 138 is received in operation 604, the computing device 202 partially decrypts the received partially decrypted ciphertext 138 by applying the received private key k to the partially decrypted ciphertext 138 modulo n, resulting in another iteration of the partially decrypted ciphertext 138.

In operation 608, the communications interface device 214 of the computing device 202 transmits the partially decrypted ciphertext 138 to another example of the computing device 202. For example, as shown in FIGS. 1 and 4, where the computing device 202 is an example of the second computing device 136, the second computing device 136 transmits the partially decrypted ciphertext 138 to the third computing device 140. The transmission of the partially decrypted ciphertext 138 to another computing device 202 is reflected in one of the example handshake scenarios illustrated in FIG. 3 and described in greater detail herein. Upon transmission of the partially decrypted ciphertext 138, the computer-implemented method 600 terminates.

Figure 7:
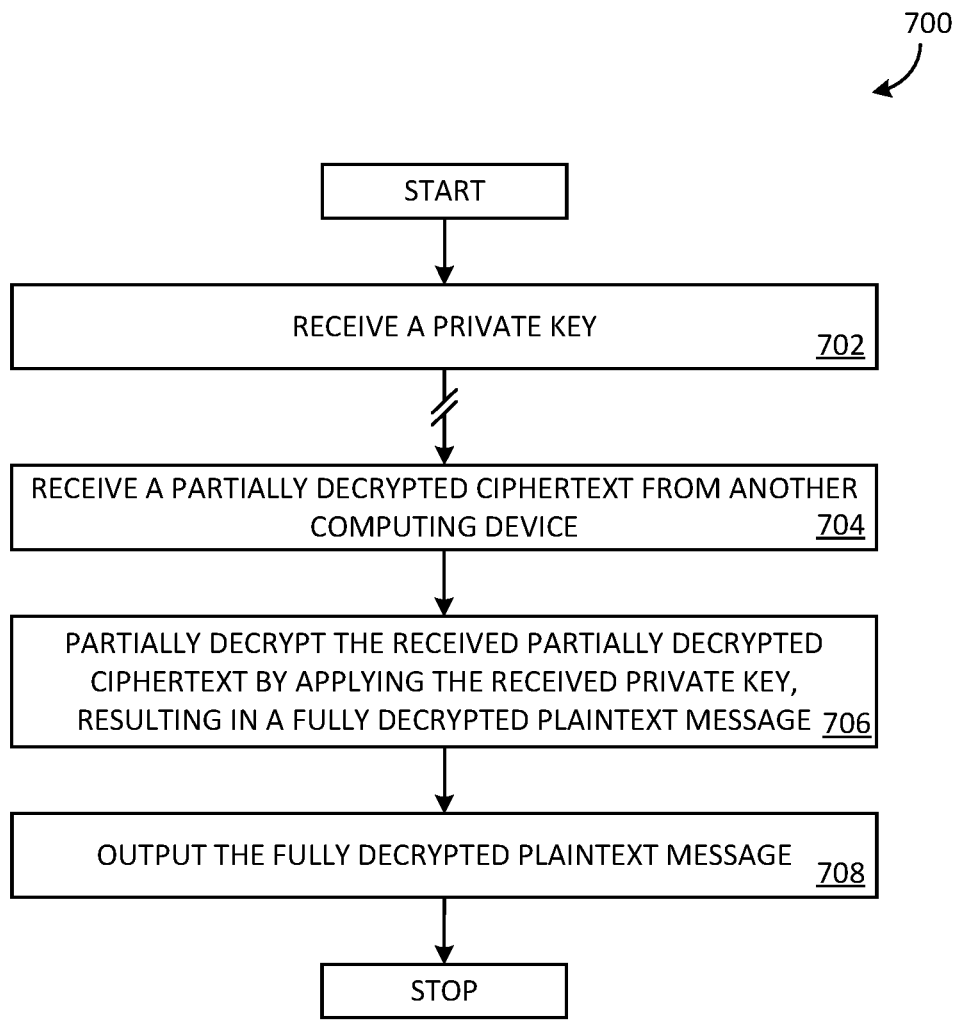
FIG. 7 is a flowchart illustrating an example computer-implemented method of data decryption.

FIG. 7 is an example flowchart illustrating a computer-implemented method of data decryption according to an example. The computer-implemented method 700 of FIG. 7 is provided for illustration only and should not be construed as limiting. Other examples of the computer-implemented method 700 can be used without departing from the scope of the present disclosure. In some examples, the computer-implemented method 700 is implemented by the computing device 202, which may be implemented as either the second computing device 136 or the third computing device 140 as described herein. As described herein, the computer-implemented method 700 illustrates an example of data decryption that results in a fully decrypted plaintext 142, such as partial decryption performed where at least one iteration of partial decryption has been performed prior to the computer-implemented method 700 being performed. For example, the computer-implemented method 700 is performed by a computing device 202 following the computer-implemented method 600 being performed by a different iteration or implementation of the computing device 202.

The computer-implemented method 700 begins by the communications interface device 214 of the computing device 202 receiving a private key k from the first computing device 102 in operation 702. As described herein, the computing device 202 receives a single private key k that may be used to partially decrypt a partially decrypted ciphertext 138. When performed following the computer-implemented method 600, the private key k received in operation 702 is different than the private key k received in operation 602.

In operation 704, the communications interface device 214 of the computing device 202 receives a partially decrypted ciphertext 138 from another example of the computing device 202. For example, the partially decrypted ciphertext 138 has gone through at least one iteration of the partial decryption performed by a different computing device, and thus is already in a partially decrypted format. Receiving the partially decrypted ciphertext 138 occurs as part of one of the example handshake scenarios illustrated in FIG. 3 and described in greater detail herein.

In operation 706, the decryption tool 220 of the computing device 202 partially decrypts the received partially decrypted ciphertext 138 by applying the private key k received in operation 702. For example, the decryption tool 220 applies the received private key k to the partially decrypted ciphertext 138 modulo n, resulting in a fully decrypted plaintext 142.

In operation 708, the computing device 202 outputs the fully decrypted plaintext 142. In some examples, the computing device 202 outputs the fully decrypted plaintext 142 to another external device, such as the user device 144. In some examples, the computing device 202 outputs the fully decrypted plaintext 142 via the UI 212. Upon output of the fully decrypted plaintext 142, the computer-implemented method 700 terminates.

Exemplary Operating Environment

Figure 8:
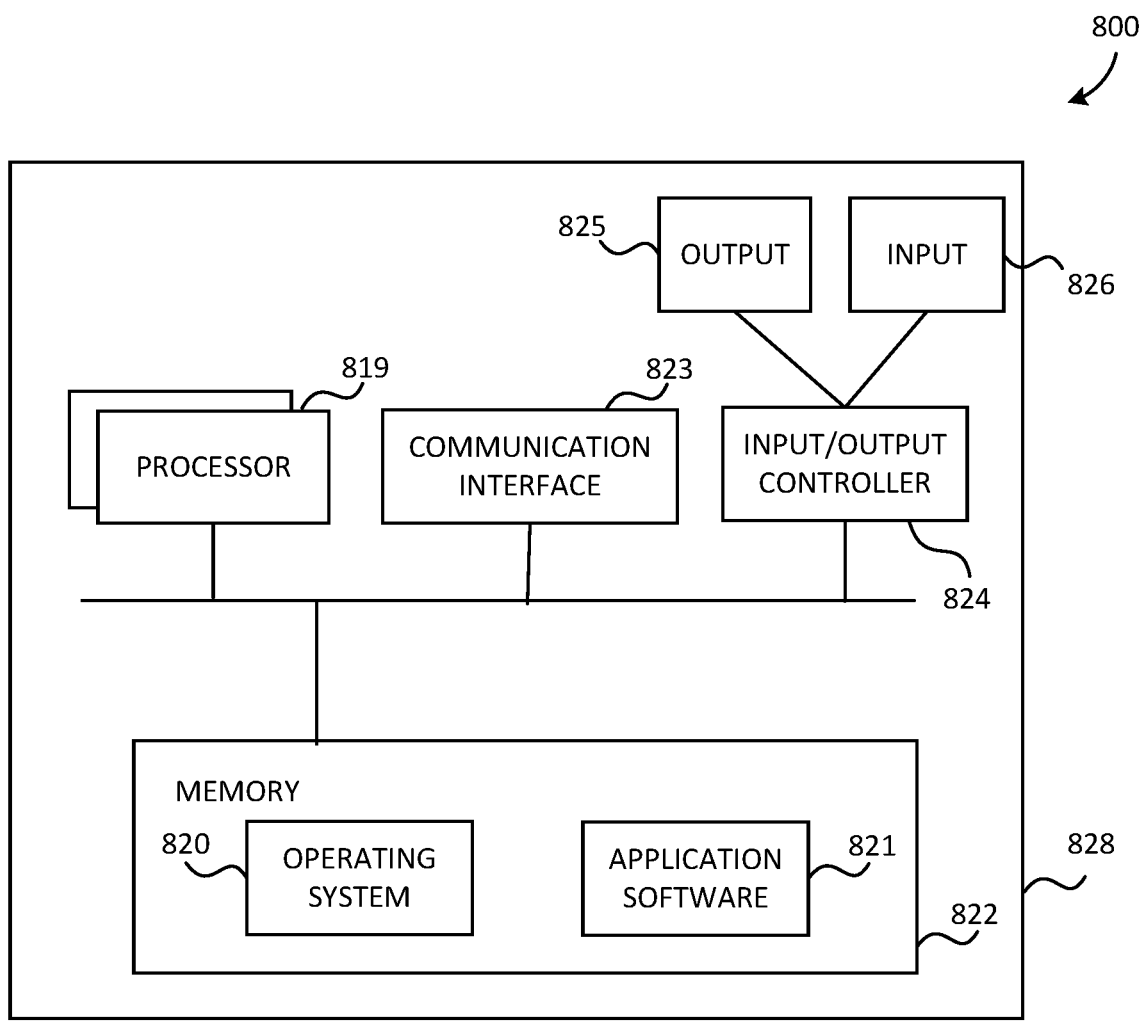
FIG. 8 is a block diagram of an example computing device for implementing examples of the present disclosure.

The present disclosure is operable with a computing apparatus according to an example as a functional block diagram 800 in FIG. 8. In an example, components of a computing apparatus 828 may be implemented as a part of an electronic device according to one or more examples described in this specification. For example, the computing apparatus 828 can be the first computing device 102 illustrated in FIG. 1 and/or the computing device 202 illustrated in FIG. 2. The computing apparatus 828 comprises one or more processors 819 which may be microprocessors, controllers, or any other suitable type of processors for processing computer executable instructions to control the operation of the electronic device. Alternatively, or in addition, the processor 819 is any technology capable of executing logic or instructions, such as a hardcoded machine. Platform software comprising an operating system 820 or any other suitable platform software may be provided on the apparatus 828 to enable application software 821 to be executed on the device.

Computer executable instructions may be provided using any computer-readable media that are accessible by the computing apparatus 828. Computer-readable media may include, for example, computer storage media such as a memory 822 and communications media. Computer storage media, such as a memory 822, include volatile and non-volatile, removable, and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 822) is shown within the computing apparatus 828, it will be appreciated by a person skilled in the art, that the storage may be distributed or located remotely and accessed via a network or other communication link (e.g., using a communication interface 823).

In some examples, the computer-readable media includes instructions that, when executed by the processor 819, execute instructions for the communications interface device 114, message generator 120, key generator 122, and encryptor 130, and/or the communications interface device 214 and decryption tool 220.

The computing apparatus 828 may comprise an input/output controller 824 configured to output information to one or more output devices 825, for example a display or a speaker, which may be separate from or integral to the electronic device. For example, the output device 825 can be a user interface. The input/output controller 824 may also be configured to receive and process an input from one or more input devices 826, for example, a keyboard, a microphone, or a touchpad. In some examples, the one or more input devices 826 is an input reception module. In one example, the output device 825 may also act as the input device. An example of such a device may be a touch sensitive display that functions as both the input/output controller 824. The input/output controller 824 may also output data to devices other than the output device, e.g., a locally connected printing device. In some examples, a user may provide input to the input device(s) 826 and/or receive output from the output device(s) 825.

The functionality described herein can be performed, at least in part, by one or more hardware logic components. According to an example, the computing apparatus 828 is configured by the program code when executed by the processor 819 to execute the examples of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an example computing device, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

In examples involving a general-purpose computer, aspects of the disclosure transform the general-purpose computer into a special-purpose computing device when configured to execute the instructions described herein.

An example system for data encryption includes a memory and a processor coupled to the memory. The processor generates a public key as a function of a modulus and an encryption value, determines a modular multiplicative inverse of a value that involves the modulus and the encryption value, factors the modular multiplicative inverse into a first factor and a second factor, the first factor representing a first private key and the second factor representing a second private key, transmits the first private key to a first computing device and transmit the second private key to a second computing device, encrypts plaintext into an encrypted message using the generated public key, and transmits the encrypted message to one of the first computing device or the second computing device.

An example computer-implemented method for data encryption includes generating, by a key generator implemented on a processor, a public key as a function of a modulus and an encryption value, determining, by the key generator, a modular multiplicative inverse of a value that involves the modulus and the encryption value, factoring, by the key generator, the modular multiplicative inverse into a first factor and a second factor, the first factor representing a first private key and the second factor representing a second private key, transmitting, by a communication interface, the first private key to a first cloud provider and transmit the second private key to a second cloud provider, encrypting, by an encryptor implemented on the processor, plaintext into an encrypted message using the generated public key, and transmitting, by the communication interface, the encrypted message to the first cloud provider for partial decryption using the first private key.

Examples of computer-readable storage media store computer-executable instructions for data decryption that, upon execution by a processor, cause the processor to receive, from a first computing device, a first private key, receive, from a second computing device, a partially decrypted version of an encrypted message, the partially decrypted version having been decrypted by the second computing device using a second private key, and complete decryption of the partially decrypted message using the received first private key resulting in a fully decrypted message.

Alternatively, or in addition to the other examples described herein, examples include any combination of the following:

wherein the processor transmits the encrypted message to the first computing device for partial decryption using the first private key, wherein the first computing device transmits the partial decryption to the second computing device to generate the plaintext using the second private key;

wherein the processor further selects a first prime number and a second prime number, generates the modulus based on the selected first prime number and the selected second prime number, and releases the generated modulus as a first portion of the public key;

wherein the processor further calculates a Carmichael's totient function as a function of the generated modulus, and generates a second portion of the public key based at least in part on the calculated Carmichael's totient function;

wherein the modular multiplicative inverse of the generated public key is a non-prime number;

wherein the processor further determines the determined modular multiplicative inverse of the generated public key is a prime number, and in response to determining the determined modular multiplicative inverse of the generated public key is not the prime number, generates a second public key as a function of the modulus and the encryption value;

wherein the first computing device is a first cloud provider and the second computing device is a second cloud provider, different from the first cloud provider;

wherein the first computing device is selected from at least one of the following: an application, an electronic device, a user interface, a cloud provider, and an on-premises device;

wherein the first private key is different than the second private key;

wherein factoring comprises factoring the modular multiplicative inverse into three factors, each required for successive partial decryption of the encrypted message into the plaintext;

wherein the instructions further cause the processor to establish connection with the second computing device to receive the partially decrypted version of the encrypted message; and wherein the fully decrypted message includes first data decrypted by the second computing device and second data decrypted using the received first private key.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one example or may relate to several examples. The examples are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

The invention claimed is:

1. A system comprising:
a memory; and
a processor coupled to the memory that:
  generates a public key as a function of a modulus and an encryption value;
  determines a modular multiplicative inverse of a value that involves the modulus and the encryption value;
  factors the modular multiplicative inverse into a first factor and a second factor, the first factor representing a first private key enabling a first partial decryption and the second factor representing a second private key enabling a second partial decryption;
  transmits the first private key to a first computing device and transmits the second private key to a second computing device, the first computing device controlled by a first provider and the second computing device controlled by a second provider, wherein neither the first provider nor the second provider has access to both the first private key and the second private key;
  encrypts plaintext into an encrypted message using the generated public key; and
  transmits the encrypted message to one of the first computing device or the second computing device.

2. The system of claim 1, wherein the processor transmits the encrypted message to the first computing device for partial decryption using the first private key, wherein the first computing device transmits the partial decryption to the second computing device to generate the plaintext using the second private key.

3. The system of claim 1, wherein the processor further:
selects a first prime number and a second prime number; and
generates the modulus based on the selected first prime number and the selected second prime number wherein the generated modulus represents a first portion of the public key, the modulus being generated such that factoring the modulus into the selected first prime number and the selected second prime number is computationally infeasible.

4. The system of claim 3, wherein the processor further:
calculates a Carmichael's totient function as a function of the generated modulus; and
generates a second portion of the public key based at least in part on the calculated Carmichael's totient function.

5. The system of claim 1, wherein the modular multiplicative inverse of the generated public key is a non-prime number.

6. The system of claim 1, wherein the processor further:
determines the determined modular multiplicative inverse of the generated public key is a prime number; and
in response to determining the determined modular multiplicative inverse of the generated public key is not the prime number, re-generates the public key as a function of the modulus and another encryption value.

7. The system of claim 1, wherein the first computing device is a first cloud provider and the second computing device is a second cloud provider different from the first cloud provider.

8. The system of claim 1, wherein transmitting the second private key to a second computing device further comprises:
the second computing device and the first computing device being a same computing device; and
the second private key being input to the second computing device by a user as a password.

9. A computer-implemented method comprising:
generating, by a key generator implemented on a processor, a public key as a function of a modulus and an encryption value;
determining, by the key generator, a modular multiplicative inverse of a value that involves the modulus and the encryption value;
factoring, by the key generator, the modular multiplicative inverse into a first factor and a second factor, the first factor representing a first private key enabling a first partial decryption and the second factor representing a second private key enabling a second partial decryption;
transmitting, by a communication interface, the first private key to a first cloud provider and transmitting the second private key to a second cloud provider, the first cloud provider controlled by a first provider and the second cloud provider controlled by a second provider, wherein neither the first provider nor the second provider has access to both the first private key and the second private key;
encrypting, by an encryptor implemented on the processor, plaintext into an encrypted message using the generated public key; and
transmitting, by the communication interface, the encrypted message to the first cloud provider for partial decryption using the first private key.

10. The computer-implemented method of claim 9, wherein the first cloud provider transmits the partial decryption to the second cloud provider to generate the plaintext using the second private key.

11. The computer-implemented method of claim 9, further comprising:
selecting, by the key generator, a first prime number and a second prime number; and
generating, by the key generator, the modulus based on the selected first prime number and the selected second prime number,
wherein the generated modulus represents a first portion of the public key.

12. The computer-implemented method of claim 11, further comprising:

calculating, by the key generator, a Carmichael's totient function as a function of the generated modulus; and generating, by the key generator, a second portion of the public key based at least in part on the calculated Carmichael's totient function.

13. The computer-implemented method of claim 9, wherein the modular multiplicative inverse of the generated public key is a non-prime number.

14. The computer-implemented method of claim 9, further comprising:

determining, by the key generator, the determined modular multiplicative inverse of the generated public key is a prime number; and in response to determining the determined modular multiplicative inverse of the generated public key is not the prime number, re-generating, by the key generator, the public key as a function of the modulus and another encryption value.

15. The computer-implemented method of claim 9, wherein the first cloud provider is different from the second cloud provider, and neither the first provider nor the second provider having access to both the first private key and the second private key reduces a likelihood that a single provider or a single private key being compromised would compromise the encrypted message.

16. The computer-implemented method of claim 9, wherein the first cloud provider is selected from at least one of the following:

an application, an electronic device, a user interface, a cloud provider, or an on-premises device.

17. The computer-implemented method of claim 9, wherein the first private key is different than the second private key.

18. The computer-implemented method of claim 9, wherein factoring comprises factoring the modular multiplicative inverse into three factors, each required for successive partial decryption of the encrypted message into the plaintext.

19. A computer storage medium storing instructions that, when executed by a processor, cause the processor to:

obtain, from a first computing device controlled by a first provider, a first private key enabling a first partial decryption;

obtain, from a second computing device controlled by a second provider, a partially decrypted version of an encrypted message, the partially decrypted version of the encrypted message having been decrypted by the second computing device using a second private key enabling a second partial decryption;

complete decryption of the partially decrypted version of the encrypted message using the obtained first private key resulting in a fully decrypted message; and wherein neither the first provider nor the second provider has access to both the first private key and the second private key.

20. The computer storage medium of claim 19, wherein the instructions further cause the processor to:

establish a connection with the second computing device to obtain the partially decrypted version of the encrypted message.

\* \* \* \* \*